UNITED STATES PATENT OFFICE.

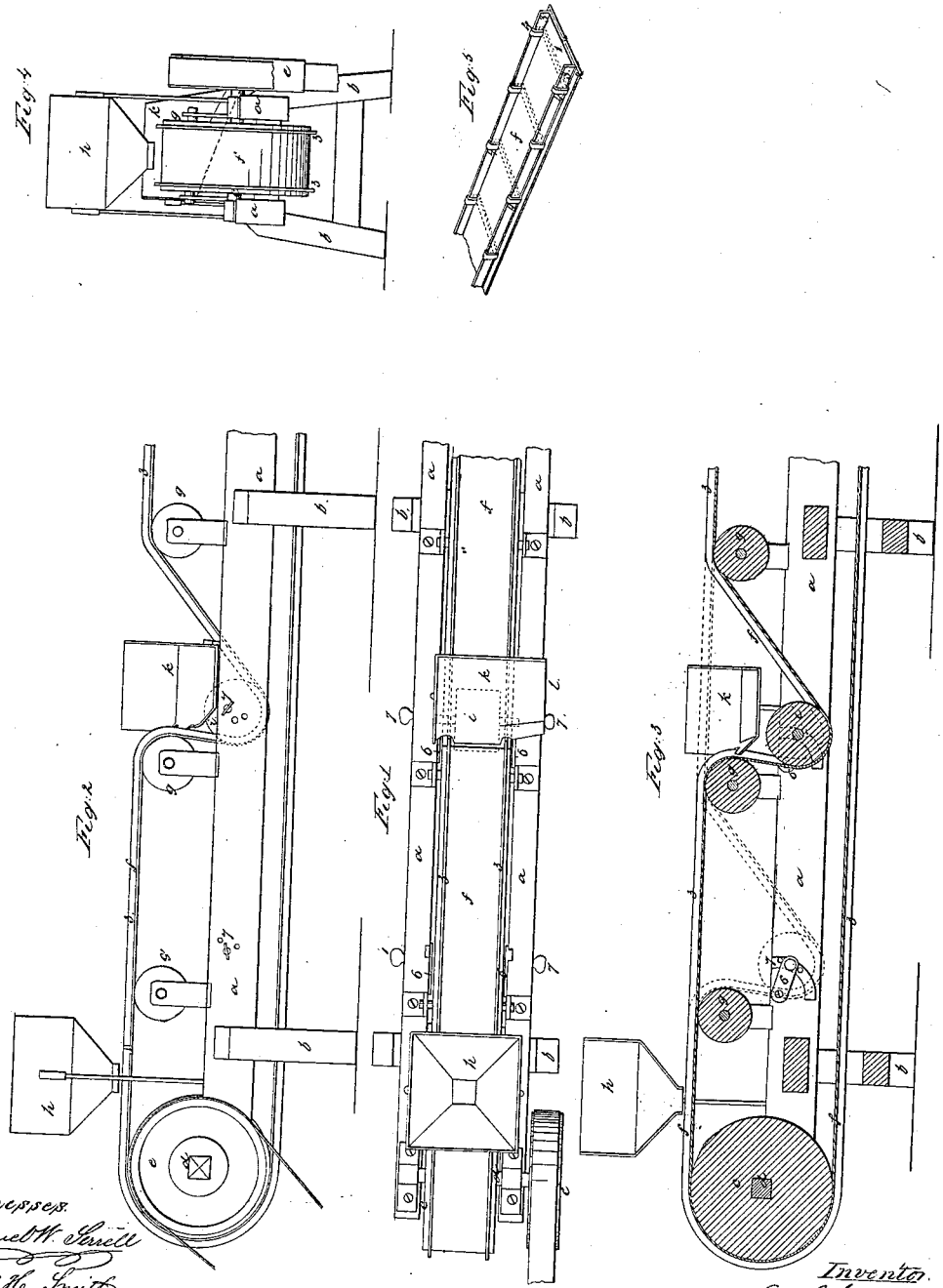

OREN C. DODGE, OF NEW YORK, N. Y.

IMPROVEMENT IN GRAIN-CONVEYERS.

Specification forming part of Letters Patent No. 37,615, dated February 10, 1863.

*To all whom it may concern:*

Be it known that I, OREN C. DODGE, of the city, county, and State of New York, have invented, made, and applied to use a certain new and useful Improvement in Means for Conveying and Delivering Grain; and I do hereby declare the following to be a full, clear, and exact description of my said invention, reference being had to the annexed drawings, making part of this specification, wherein—

Figure 1 is a plan of my said apparatus for conveying and delivering grain. Fig. 2 is a side elevation thereof. Fig. 3 is a vertical section. Fig. 4 is an end view of said apparatus, and Fig. 5 is a perspective view of part of the traveling belt.

Similar marks of reference denote the same parts.

Two belts have heretofore been fitted with a canvas, that sagged between them and received the grain and conveyed it along horizontally. This device was liable to get out of order and occupied considerable space. It was also expensive on account of requiring two belts and therefore two sets or lines of pulleys or rollers. This device would only deliver the grain at one point, (the far end,) and therefore a separate apparatus was required to convey the grain to each bin or other receptacle.

The nature of my said invention consists in a traveling belt with vertical or nearly vertical edges, forming a trough for the reception of grain and its conveyance horizontally, or nearly so, to the points of delivery, to the bins or other receptacles. I also provide means for bending the belt at any desired points along its length, to allow for the introduction of a hopper or chute that passes the grain away. This device can be placed at any required point, so that the grain will be delivered to the desired bin or other receptacle. By this construction the said belt can be strained as tightly as necessary over the driving-pulleys; and supporting-rollers are to placed beneath said belt at suitable distances to sustain the weight of grain conveyed upon said belt, thus rendering my apparatus compact, convenient, and durable.

In the drawings, *a* is a suitable frame on legs *b*. At one end is a drum, *c*, on a shaft, *d*, driven by power applied to the pulley *e* or otherwise. The frame *a* extends horizontally in a straight line any required distance. I have shown the same as broken off in the drawings. At the other end of this frame *a* is a drum similar to the drum *c*, and around this drum and the drum *c* the grain-conveying belt *f* passes, and is sustained at suitable intervals by rollers *g g*.

*h* represents the hopper from which the grain is delivered upon the belt. The grain may be delivered at any point along the line of the belt by bending the belt at said point, so as to introduce a hopper or chute, for which purpose I employ a roller, *i*, in journals at the ends of swinging links 6 6, or their equivalents, kept in place by screws 7, so as to adjust the position of said roller, the belt passing down from one of the rollers *g* beneath said roller *i* and then up over the next roller *g*, as represented. This depression or bend in the belt *f* gives opportunity for introducing the hopper or chute *k* to receive the grain from the belt and deliver it at *l* on one side of the machine. The hopper or chute can be applied so as to deliver on either side of the belt, as required. When it is desired to change the point of delivery, the hopper or chute *k* and the roller *i* with its journals may be removed to any desired point of delivery along the line of the belt, the frame being fitted so as to receive these parts. The belt *f* is to be fitted with raised edges 3 3 to form a trough and keep the grain in position. These edges should be of elastic material, so, as to stretch while traveling around the pulleys *c*. I prefer that metallic strips 4 4 be inserted between the thicknesses 1 and 2, composing the belt, and that these strips be bent up at right angles, or nearly so, to the surface of the belt, and folded over, so as to clasp and retain the edge pieces 3 3, in which construction the elastic material of which these edge pieces are composed may be comparatively thin and still retain its position and be efficient in use, forming a trough for the reception and conveyance of the grain. In some instances the grain may be delivered on the top of the lower line of the belt, in which case the roller *i* and hopper or chute *k* are to be used in a similar manner to that before set forth. The raised edges 3 3, however, will be on the other side of the belt, and the belt *f* may be raised on an incline as it approaches the hopper or chute *k*, the roller *g* being raised so that the roller *i* will not require to be so much below the general line of the belt.

What I claim as my invention, and desire to secure by Letters Patent, is—

1. Delivering the grain at any desired point along the line of a traveling belt by bending said belt substantially as specified for the introduction of a hopper or chute.

2. A traveling belt for conveying grain, provided with vertical or nearly vertical edges, forming a trough, substantially as set forth.

3. The elastic edges 3 3 of the belt $f$, sustained by the metallic strips 4 4, substantially as specified.

In witness whereof I have hereunto set my signature this 22d day of December, 1862.

OREN C. DODGE.

Witnesses:
 LEMUEL W. SERRELL,
 CHAS. H. SMITH.